United States Patent
Dhome et al.

(10) Patent No.: US 9,728,005 B2
(45) Date of Patent: Aug. 8, 2017

(54) METHOD OF CALIBRATING A COMPUTER-BASED VISION SYSTEM ONBOARD A CRAFT

(71) Applicants: UNIVERSITE BLAISE PASCAL-CLERMONT II, Clermont-Ferrand (FR); UNIVERSITE D'AUVERGNE CLERMONT I, Clermont Ferrand (FR); CENTRE NATIONAL DE LA RECHERCHE SCIENTIFIQUE (C.N.R.S), Paris (FR)

(72) Inventors: Michel Dhome, Pont du Chateau (FR); Eric Royer, Saint Georges sur Allier (FR); Maxime Lhuillier, Clermont-Ferrand (FR); Datta Ramadasan, Ceyrat (FR); Nadir Karam, Clermont-Ferrand (FR); Clément Deymier, Chamalières (FR); Vadim Litvinov, Clermont-Ferrand (FR); Hicham Hadj Abdelkader, Evry (FR); Thierry Chateau, Combronde (FR); Jean-Marc Lavest, Riom (FR); François Marmoiton, Bussières et Pruns (FR); Serge Alizon, Les Martres de Veyre (FR); Laurent Malaterre, Mirefleurs (FR); Pierre Lebraly, Giat (FR)

(73) Assignees: Universite D' Auvergne Clermont I, Clermont Ferrand (FR); Universite Blaise Pascal-Clermong II, Clermont-ferrand (FR); Centre National De La Recherche Scientifique (C.N.R.S.), Paris (FR)

( * ) Notice: Subject to any disclaimer, the term of this patent is extended or adjusted under 35 U.S.C. 154(b) by 166 days.

(21) Appl. No.: 14/350,983

(22) PCT Filed: Oct. 9, 2012

(86) PCT No.: PCT/EP2012/069958
§ 371 (c)(1),
(2) Date: Apr. 10, 2014

(87) PCT Pub. No.: WO2013/053701
PCT Pub. Date: Apr. 18, 2013

(65) Prior Publication Data
US 2014/0267608 A1    Sep. 18, 2014

(30) Foreign Application Priority Data

Oct. 10, 2011   (FR) .................................. 11 59135

(51) Int. Cl.
*G06T 19/00*          (2011.01)
*H04N 7/18*           (2006.01)
(Continued)

(52) U.S. Cl.
CPC ............ *G06T 19/003* (2013.01); *G06T 7/579* (2017.01); *G06T 7/80* (2017.01); *H04N 7/181* (2013.01);
(Continued)

(58) Field of Classification Search
CPC ... G06T 19/003; H04N 13/0282; H04N 7/181
(Continued)

(56) References Cited

U.S. PATENT DOCUMENTS 6,307,959 B1 * 10/2001 Mandelbaum ........ G06T 7/0065
382/104

OTHER PUBLICATIONS

Mouragnon E. et al., "3D reconstruction of complex structures with bundle adjustment: an incremental approach", Robotics and Automation, (May 2006), pp. 3055-3061.
(Continued)

*Primary Examiner* — Hee-Yong Kim
(74) *Attorney, Agent, or Firm* — Meunier Carlin & Curfman LLC

(57) ABSTRACT

This method of calibration comprising the reconstruction of a 3D mapping of 3D landmarks of an environment on the
(Continued)

basis of digital images of the environment captured by the computer-based vision system (10) during the movement of the craft (2) along a trajectory. It comprises the optimization of at least one 3D mapping corresponding to a first sequence of images by considering at least one extrinsic parameter and/or at least one intrinsic parameter and/or at least one parameter of poses and/or one parameter of 3D landmarks as constant and the optimization of at least one 3D mapping corresponding to a second sequence of images, longer than the first image sequence and including the first image sequence, by considering said at least one extrinsic parameter and/or said at least one intrinsic parameter and/or said at least one parameter of poses and/or said at least one parameter of 3D landmarks as variable so as to estimate it.

19 Claims, 3 Drawing Sheets

(51) Int. Cl.
| | | |
|---|---|---|
| *H04N 13/02* | (2006.01) | |
| *G06T 15/10* | (2011.01) | |
| *H04N 5/445* | (2011.01) | |
| *H04N 7/16* | (2011.01) | |
| *G06F 13/00* | (2006.01) | |
| *G06F 3/00* | (2006.01) | |
| *G06T 7/80* | (2017.01) | |
| *G06T 7/579* | (2017.01) | |

(52) U.S. Cl.
CPC .................. *H04N 13/0282* (2013.01); *G06T 2207/10016* (2013.01); *G06T 2207/20016* (2013.01); *G06T 2207/30244* (2013.01); *G06T 2207/30252* (2013.01)

(58) Field of Classification Search
USPC .......................................................... 348/43
See application file for complete search history.

(56) References Cited

OTHER PUBLICATIONS

Fraundorfer F. et al., "A constricted bundle adjustment parameterization for relative scale estimation in visual odometry", (May 2010), pp. 1899-1904.

\* cited by examiner

METHOD OF CALIBRATING A COMPUTER-BASED VISION SYSTEM ONBOARD A CRAFT

STATEMENT REGARDING FEDERALLY FUNDED RESEARCH

This invention and the corresponding work have been sponsored by the French government research program "Investissements d'avenir" through the IMobS3 Laboratory of Excellence (ANR-10-LABX-16-01), by the European Union through the program "Regional competitiveness and employment 2007-2013" (ERDF—Auvergne region), and by the Auvergne region.

CROSS REFERENCE TO RELATED APPLICATIONS

This application is a 35 USC 371 national phase of International Application No. PCT/EP2012/069958, filed Oct. 9, 2012, which claims priority to French Patent Application No. 1159135, filed Oct. 10, 2011, the contents of all of which are hereby incorporated herein by reference in their entirety.

This invention relates to a method for calibrating a computer-based vision system on-board a vehicle, comprising a rigid set of cameras having extrinsic parameters and intrinsic parameters.

It is possible to use a computer-based vision system comprising a rigid set of synchronized cameras to determine a 3D reconstruction of an environment in which a vehicle is moving.

It is possible to use such a computer-based vision system for guiding a autoguided vehicle, designed to use images taken by the computer-based vision system in order to move, for example along a learned reference trajectory.

To do this, it is possible to use a 3D reconstruction based on images taken by the moving computer-based vision system ("Structure From Motion" or "SFM").

In such a method, in a learning stage, an operator can control the movement of the vehicle along a reference trajectory. The vehicle can also be controlled automatically without an operator by performing pre-recorded movements. During the movement, the computer-based vision system captures images from the environment, each image corresponding to a pose of the computer-based vision system. Each image comprises a matrix of 2D points or pixels, each defined by its position in the matrix and other parameters such as colour or intensity. A pose defines the position and orientation of the computer-based vision system in a Euclidian coordinate system that can be global or local (with respect to a neighbouring pose) as well as the translation thereof in said Euclidean coordinate system. The position is expressed by three translation parameters corresponding to the coordinates according to the axes of said coordinate system, and the orientation is expressed for example by three angles (Euler angles) with respect to said coordinate system.

The computer-based vision system identifies characteristic 2D poses in each image, matches the characteristic 2D landmarks between images ("template matching") and reconstructs, on the basis of the matched 2D landmarks, a 3D mapping comprising the parameters of the 3D landmarks of the environment corresponding to the matched 2D landmarks and the pose parameters of the computer-based vision system corresponding to the images used for the reconstruction, associated with 3D landmarks potentially visible by the computer-based vision system when it is in this pose. The 3D mapping can also associate, with each 3D point, an area of interest surrounding the point.

The 3D landmarks and the 2D landmarks can in particular be 3D points and 2D points (obtained from images). The parameters of the 3D points are the position coordinates of the 3D points, enabling each 3D point to be located in space.

The poses parameters are, for each pose, the translation parameters and the rotation parameters defining the pose.

The camera set comprises extrinsic parameters, which are the parameters of the rigid transformations making it possible to go from the coordinate position of one camera to the coordinate position of another camera of the camera set. The rigid transformation making it possible to go from one camera to another camera can be defined by three translation parameters and three rotation parameters in the Euclidean coordinate system, i.e. six parameters.

The camera set comprises intrinsic parameters specific to each camera. In a pinhole camera, the intrinsic parameters can comprise in particular the focal length, the position of the principal point, the centre of the image and the distortion coefficients.

The document Mouragnon et al., "3D reconstruction of complex structures with bundle adjustment: an incremental approach", Processing IEEE International Conference on Robotics and Automation, ICRA. Orlando, Fla., USA, May 15-19, 2006, Piscataway, N.J., USA, IEEE, 15 May 2006, pages 3055-3061, DOI: 10.1109/ROBOT.2006.1642166, ISBN: 978-0-7803-9505-3, discloses, for a monocular vision system, a reconstruction algorithm processing the images obtained by a calibrated camera, i.e. the parameters of which are considered to be constant during the reconstruction.

However, the precision of the 3D mapping and the guiding of the vehicle on the basis of the 3D mapping are dependent upon the precise knowledge of extrinsic parameters and intrinsic parameters.

One of the objectives of the invention is therefore to provide a calibration method making it possible to precisely estimate the extrinsic parameters and/or the intrinsic parameters of the camera set, which can be implemented rapidly.

To this end, the invention proposes a method for calibrating a computer-based vision system on-board a vehicle, a product and a device according to the claims.

The invention and its advantages will be easier to understand in view of the following description, provided solely as an example and with reference to the appended drawings, wherein.

Figure 1:
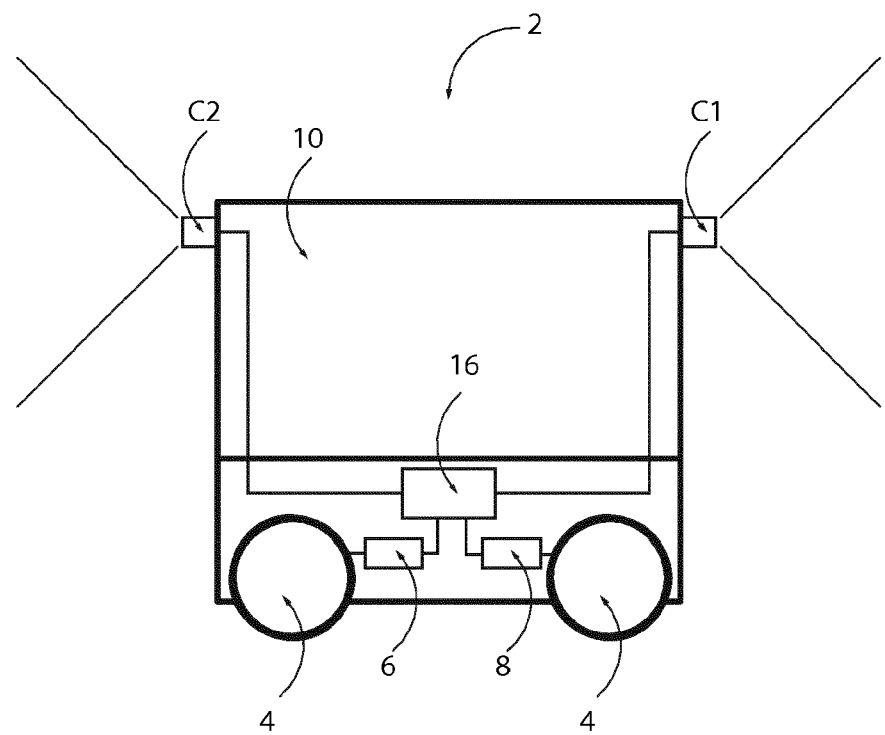
FIG. 1 is a diagrammatic side view of a self-guided vehicle comprising a computer-based vision system with two cameras enabling the method according to the invention to be implemented.

The vehicle 2 shown in FIG. 1 is an autoguided vehicle (AGV). It comprises wheels 4, comprising at least one steering wheel, a steering system 6 for controlling the steering of each steering wheel, a drive system 8 coupled to at least one of the wheels 4 in order to cause the vehicle 2 to move forward or backward, and a computer-based vision system 10 for controlling the steering system 6 and the motor 8 so as to control the movement of the vehicle, so that the vehicle can move autonomously.

The computer-based vision system 10 comprises a set of cameras $C_1$, $C_2$ synchronized so as to capture images simultaneously. The camera set is rigid: the cameras $C_1$, $C_2$ are rigidly connected to one another and are therefore immobile with respect to one another.

The cameras $C_1$, $C_2$ are arranged on the vehicle 2 so as to take images of the environment of the vehicle. The cameras $C_1$, $C_2$ are oriented so that their fields of view are separated or do not overlap: the scene visible to each camera is invisible to the other camera in a given pose of the camera set.

In the example shown, the computer-based vision system 10 comprises two cameras: a front camera $C_1$ fixed on the vehicle 2 so as to take images toward the front of the vehicle 2 and a rear camera $C_2$ fixed on the vehicle 2 so as to take images toward the rear of the vehicle 2.

The computer-based vision system 10 comprises an information processing module 16 suitable for receiving and processing the digital images captured by the computer-based vision system 10 in order to determine the position of the vehicle 2 and control the steering system 6 and the drive system 8 so as to move the vehicle 2.

The information processing module 16 is programmed for implementing a method according to the invention. The information processing module 16 comprises a computer and a memory in which a computer program is stored, which contains software instructions that, when they are implemented by the information processing module, implement a calibration method according to the invention.

In the description below, unless otherwise indicated, the term "image" refers to an image of the environment provided by the computer-based vision system 10 and grouping the images provided individually by each camera $C_1$, $C_2$, and the term "pose" refers to a pose of the computer-based vision system 10.

Each camera $C_1$, $C_2$ has intrinsic parameters. The intrinsic parameters influence the correspondence between the real environment and the corresponding image provided by the camera $C_1$, $C_2$. The intrinsic parameters of a camera can comprise in particular the focal length, the position of the principal point, the centre of the image and the distortion coefficients.

The camera set comprises extrinsic parameters. These extrinsic parameters determine the relationship between the poses of cameras $C_1$, $C_2$, which are rigidly connected to one another.

Figure 2:
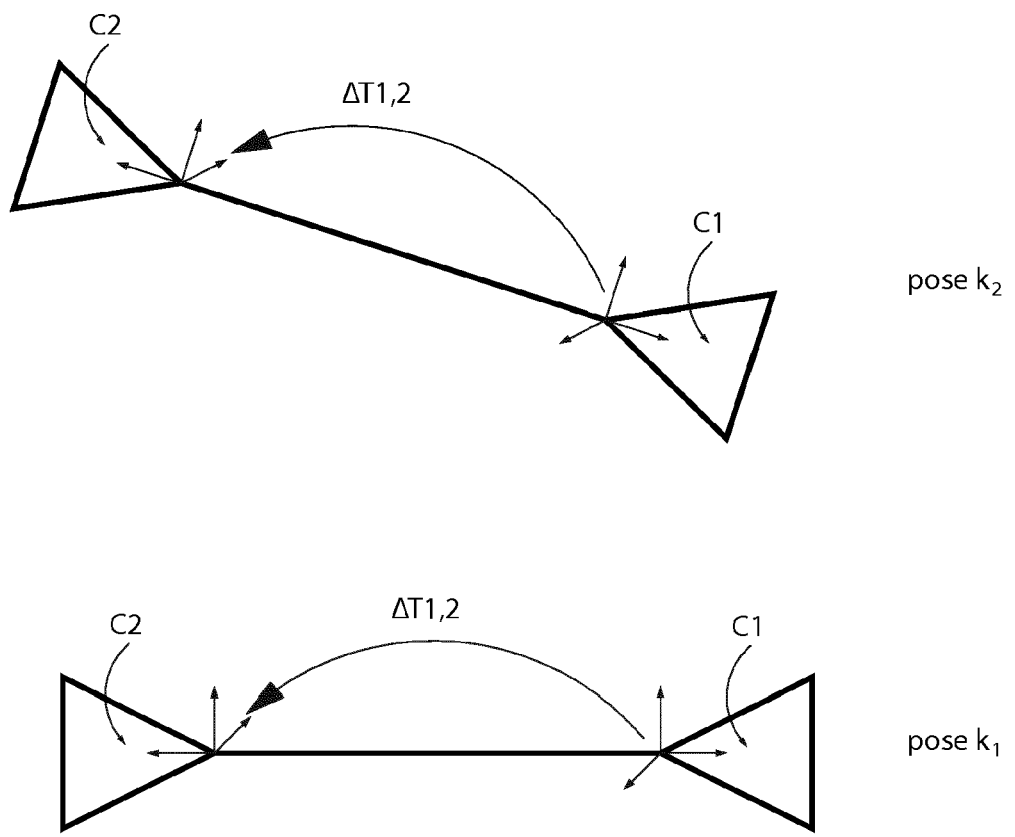
FIG. 2 is a diagrammatic view of a model of the vision system.

As shown in FIG. 2, each camera $C_1$, $C_2$ is linked to an individual coordinate position, and, in general, for each pose of the computer-based vision system 10, there is a rigid transformation $\Delta T_{i,j}$ making it possible to go from the coordinate position of camera $C_1$ to that of camera $C_j$.

In the illustrated case of two cameras $C_1$, $C_2$, there is a rigid transformation $\Delta T_{1,2}$ making it possible to go from the coordinate position of camera $C_1$ to that of camera $C_2$.

Each rigid transformation $\Delta T_{i,j}$ between two cameras can be defined by a translation $\Delta t_{i,j}$ making it possible to go from one camera to the other and a rotation $\Delta R_{i,j}$ making it possible to go from the orientation of one camera to the other. The translation $\Delta t_{i,j}$ is determined by three parameters corresponding to the translations according to three axes of a Euclidean coordinate system associated with camera Ci, and the rotation $\Delta R_{i,j}$ is determined by three parameters corresponding to the rotations about the three axes of the Euclidean coordinate system associated with camera $C_i$.

The calibration method comprises a reconstruction of a 3D mapping of the environment of the moving vehicle ("Structure From Motion" or "SFM").

According to the calibration method, digital images captured by the computer-based vision system 10 are acquired as the vehicle 2 moves along a trajectory, each image corresponding to a pose of the computer-based vision system 10 along the trajectory. In one embodiment, an operator controls the movement of the vehicle 2 along the trajectory, and, during movement, the computer-based vision system 10 captures digital images of the environment.

Each image captured by the computer-based vision system 10 comprises a matrix of pixels or 2D points. Each 2D point is defined in particular by its position in the matrix.

The calibration method comprises a 3D mapping reconstruction step, comprising 3D landmarks of the environment, poses of the computer-based vision system 10, by associating with each pose a set of 3D landmarks potentially visible to the computer-based vision system 10. The potentially visible landmarks can be associated with each camera so as to determine which 3D landmarks are potentially visible to which camera in each pose of the computer-based vision system.

Figure 3:
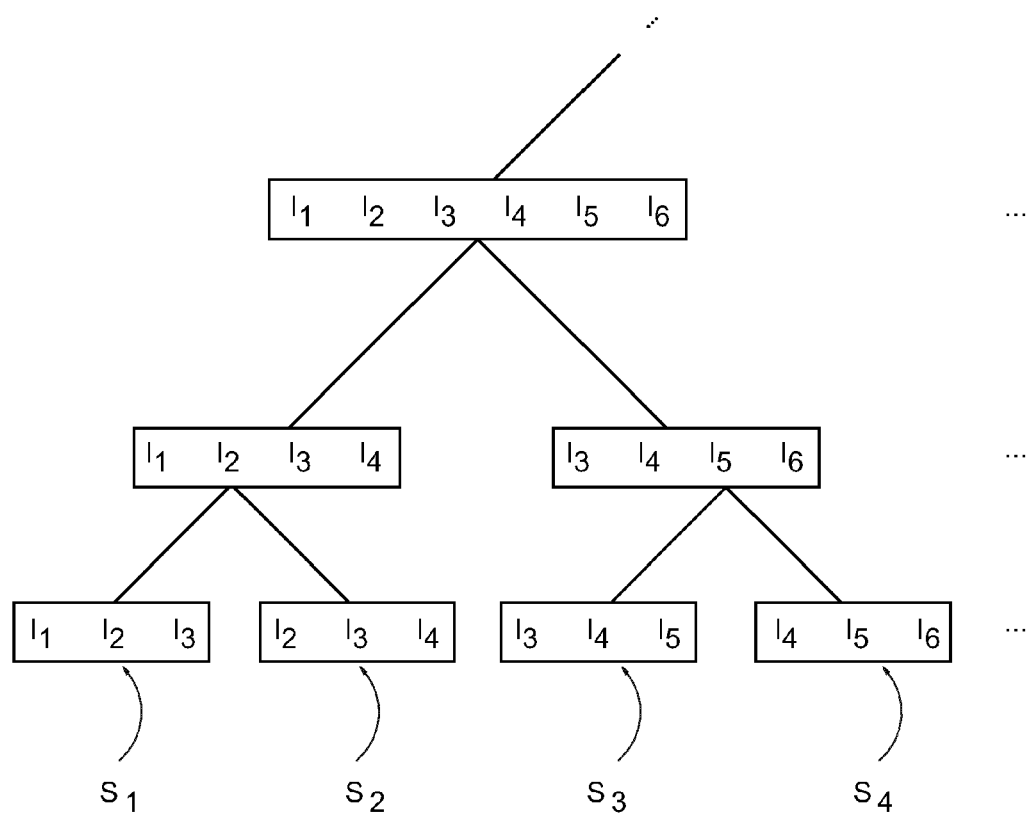
FIG. 3 is a block diagram showing a step of aggregation of 3D maps of basic sequences by ascending hierarchical fusion for a 3D mapping of the complete sequence comprising all of the basic sequences.

In one embodiment, as shown in FIG. 3, the images are grouped into basic sequences Si, each basic sequence Si comprising a number X of neighbouring images Ii with an overlap of Y images between two successive basic sequences (two successive basic sequences having Y images in common). In one embodiment, each basic sequence comprises X=3 images Ii with an overlap of Y=2 images.

The term "neighbouring images", refers to images corresponding to poses close to the computer-based vision system 10, so that these images overlap and can have 2D landmarks capable of being matched.

The calibration method comprises the reconstruction of a 3D mapping on the basis of each basic sequence $S_i$.

In one possible embodiment, the 3D mapping of the first basic sequence $S_i$ is calculated by an epipolar geometry calculation and triangulation of landmarks, then the 3D maps of the next basic sequences $S_i$ (i>1) are calculated step by step according to the mapping of the first basic sequence $S_1$.

The epipolar geometry calculation makes it possible to determine the poses of the computer-based vision system 10 corresponding to the images of the first basic sequence $S_1$. A pose is defined by three translation parameters and three rotation parameters in the global or local Euclidean coordinate system (with respect to a neighbouring pose). The triangulation makes it possible to determine the parameters of the 3D landmarks (i.e. the three-dimensional coordinates for the 3D landmarks) corresponding to the 2D landmarks matched between the images of the first basic sequence $S_1$. The parameters of a 3D point are the translation parameters in the global or local Euclidean coordinate system with respect to a pose in which the point has been observed.

The epipolar geometry calculation is performed in a known manner, for example by identification of characteristic 2D landmarks in the images of the sequence, for example by the Harris corner method, matching of characteristic 2D landmarks between the images of the sequence, calculation of poses of the computer-based vision system 10, for example by implementing a RANSAC-type algorithm on two poses and extrapolation of the third pose.

The calculation of the triangulation of the matched 2D landmarks is performed in a known manner, for example by a midpoint method. The triangulation makes it possible to obtain 3D landmarks, i.e. to determine, for matched 2D landmarks, a 3D point of the environment with its three-dimensional coordinates in the global Euclidean coordinate system.

For the reconstruction of the 3D mapping of a basic sequence based on the previous basic sequence, characteristic 2D landmarks are detected in the additional image of the basic sequence, the corresponding pose of the computer-based vision system 10 is determined on the basis of these characteristic 2D landmarks matched with characteristic 2D landmarks of the poses of the computer-based vision system 10 already calculated in the 3D mapping of the previous basic sequence, then the additional matched 2D landmarks are triangulated.

All of the basic sequences are thus reconstructed step by step.

Each 3D mapping of each basic sequence $S_i$ is optimized by implementing a bundle adjustment algorithm. A bundle adjustment algorithm is an iterative algorithm making it possible to optimize the different parameters involved in the 3D mapping calculation, by convergence of a criterion that is generally the minimization of a cost function. The parameters involved in the 3D mapping calculation based on images taken by a set of cameras comprise the 3D landmark parameters, the parameters of poses of the computer-based vision system, the extrinsic parameters of the computer-based vision system and the intrinsic parameters of the computer-based vision system. A parameter considered to be variable during the optimization will be estimated and a parameter considered to be constant or fixed will not be optimized or estimated.

The calibration method comprises the optimization of the 3D mapping of each basic sequence $S_i$ by bundle adjustment, by considering the extrinsic parameters to be constant.

The calibration method comprises the aggregation of 3D maps of the basic sequences $S_i$ to obtain the 3D mapping of the complete sequence S.

In one embodiment, as shown in FIG. 3, the aggregation is performed by implementing an ascending hierarchical aggregation method using basic sequences $S_i$ defining a first level. The passage from one level to a higher level is performed by fusion of 3D maps of the level in pairs and optimization by bundle adjustment of each 3D mapping resulting from the fusion, so that the number of 3D maps is divided by 2 when going from one level to a higher level. This basic aggregation step is implemented at each level until the complete sequence S is reconstructed.

The optimization by bundle adjustment of each 3D mapping resulting from a fusion of two 3D maps of the lower level is performed by considering the extrinsic parameters to be constant.

The algorithms implemented for the reconstruction of 3D maps advantageously comprise a method for minimizing the influence of aberrant landmarks. In one embodiment, if the reprojection error of a 3D landmark visible in a pose by a camera is greater than a threshold, the corresponding 2D landmark is rejected. The characteristic 2D landmarks are thus classified selectively into aberrant landmarks (outliers) and valid landmarks (inliers).

The 3D mapping of the complete sequence S is optimized by bundle adjustment, by considering at least one of the extrinsic parameters to be variable. The 3D mapping of the complete sequence is thus optimized by optimizing the extrinsic parameters, the 3D landmarks and the poses of the computer-based vision system 10. The optimization is performed, for example, by implementing a bundle adjustment algorithm based on an optimization technique of the Levenberg-Marquardt type.

Advantageously, the calibration method comprises a loop closure detection step, for detection and reducing drift in 3D mapping reconstructions.

The loop closure detection makes it possible to detect characteristic 3D landmarks observed in a first pose and in a second pose of the computer-based vision system, with or without switching of the cameras.

In the case of two cameras $C_1$, $C_2$ oriented in opposite directions, a closure of a loop without switching corresponds to a 360° rotation, for example by the movement of the vehicle 2 in a circle, and a loop closure with switching corresponds to a rotation of 180°, for example by a half rotation.

To take into account a closure of a loop with switching, the images of each camera and the poses of the cameras are processed individually.

To detect a closure of a loop, for a pose of a predetermined camera, the existence of a previous pose (by this predetermined camera or another camera) is verified, verifying a proximity criterion indicating that the previous pose is close enough. To do this, it is possible to verify whether the distance between the positions of two camera poses is less than a distance threshold and whether the angle of rotation for going from the orientation of one pose to the orientation of the other is less than an angle threshold.

When a close camera pose exists, the characteristic 2D landmarks of the images associated with these camera poses are matched, and if the number of matched 2D points is greater than a predetermined number, an observation associated with the matched 2D landmarks is added. The observation is, for example, the addition of the matched 2D landmarks to the previous poses of the predetermined camera, which increases the number of matched 2D landmarks with reliable matched 2D landmarks. In one embodiment, the 2D landmarks can be matched by implementing a RANSAC-type algorithm.

In one embodiment, the loop detection is performed for each pose of each camera.

In the embodiment described above, the extrinsic parameters are considered to be constant during the optimization of 3D maps of basic $S_i$ sequences and the aggregation thereof in order to obtain the 3D mapping of the complete sequence S, and are considered to be variable and therefore optimized only in the optimization by bundle adjustment of the 3D mapping of the complete sequence S.

Thus, the 3D maps of the basic sequences are optimized by considering at least one extrinsic parameter to be constant, and the 3D mapping of the complete sequence longer than each basic sequence and comprising each basic sequence is optimized by considering at least said extrinsic parameter to be variable so as to estimate it.

In addition, the basic sequences $S_i$ and the intermediate sequences are partial sequences each comprising only a portion of the images of the complete sequence S. Each 3D mapping of a partial sequence is optimized by considering the extrinsic parameters to be constant.

Alternatively, it is possible to consider at least certain extrinsic parameters to be variable during the aggregation of the 3D mappings of the basic sequences.

Thus, at least one 3D mapping of a longer intermediate sequence and comprising a basic sequence is optimized by considering at least one extrinsic parameter or each extrinsic parameter to be variable so as to estimate it.

It is possible to perform optimizations of the 3D mapping of a plurality of sequences of increasing length each comprising the previous ones, by considering at least one extrinsic parameter to be constant, then performing the optimization of a 3D mapping of the next sequence comprising the previous ones, by considering said extrinsic parameter to be variable so as to estimate it.

The optimization by bundle adjustment of the extrinsic parameters will be effective and can quickly converge to a precise solution on the basis of the movements of the computer-based vision system 10.

In one possible embodiment, if the reconstruction of a 3D mapping of a sequence shows a movement of the computer-based vision system 10, the optimization of the 3D mapping of said sequence is performed by considering extrinsic parameters to be variable according to the movement detected.

The following criteria can be applied.

If the movement detected is a movement in a straight line, the extrinsic translation parameters are considered to be constant at the initial value or at a value previously estimated, and at least one extrinsic rotation parameter is considered to be constant during the 3D mapping optimization. In one implementation, the parameter of the rotation around the direction of movement in a straight line is considered to be constant.

If the movement detected is a movement in a non-rectilinear horizontal plane, the extrinsic translation parameters, except for that of vertical translation, are considered to be variable, and the extrinsic rotation parameters are considered to be variable during the 3D mapping optimization.

If the movements detected are screwing movements with parallel axes (with at least two distinct axes), the extrinsic translation parameters, except for the translation in the direction of the screwing, are considered to be variable, and the extrinsic rotation parameters are considered to be variable during the 3D mapping optimization.

If the movement detected is a three-dimensional movement, the extrinsic translation parameters are considered to be constant at the initial value or at a previously estimated value, and the extrinsic rotation parameters are considered to be variable during the 3D mapping optimization.

In addition, in order to limit the 3D mapping optimizations, it is possible to optimize or not to optimize the extrinsic parameters according to the length of the sequences considered.

The following criteria can be applied.

If the sequence has a length shorter than a predetermined threshold, the sequence is optimized by considering the extrinsic parameters to be constant. The extrinsic parameters therefore are optimized only for the 3D mappings of sequences having a minimum length.

If the sequence has a length shorter than the longest sequence optimized by considering an extrinsic parameter to be variable, then the 3D mapping of said sequence is optimized by considering said extrinsic parameter to be constant.

The criteria of movement of the vision system and sequence length can be combined.

The calibration method can be implemented sequentially: the processing of images by the processing module 16 can be implemented after the complete sequence of images has been captured. The image capture and the 3D mapping reconstruction are performed sequentially.

The calibration method can be implemented as the vehicle 2 moves along the trajectory. The 3D mapping reconstruction can be performed on the basis of movement criteria and sequence length criteria for 3D mapping optimization by considering the extrinsic parameters to be variable or constant.

In one possible embodiment, the 3D mapping reconstruction begins from the basic sequences already available. Each extrinsic parameter is considered to be fixed or variable according to the aforementioned movement criteria, for the optimization of the 3D mapping of each basic sequence and each longer sequence reconstructed by fusion of previously reconstructed 3D mappings.

Preferably, the 3D mappings of the basic sequences are optimized with constant extrinsic parameters, only 3D mapping of longer sequences comprising the basic sequences being optimized with at least one extrinsic parameter considered to be variable.

For a new pose generating a new basic sequence, the 3D mapping of the new basic sequence is reconstructed, optimized by considering the extrinsic parameters to be constant and aggregated with the previous basic sequences.

The loop detection is implemented in each new pose generating a new basic sequence.

The optimization of the new 3D mappings reconstructed from the new basic sequence is performed according to movement and length criteria, insofar as one can expect a reliable estimation of an extrinsic parameter if a sufficient movement has occurred in order to estimate this extrinsic parameter, and insofar as one can expect to improve the estimation of the extrinsic parameter if one has a sequence longer than that from which it has already been optimized.

With this calibration method performed over time, at the end of the aggregation, an optimized 3D mapping of the complete sequence is obtained. As this sequence is the longest one, and if the calibration trajectory is correctly chosen, the 3D mapping of the complete image sequence will be optimized by considering the extrinsic parameters to be variable.

The calibration method has been described in relation to a computer-based vision system with two cameras with non-overlapping fields. The calibration method can be generalized to a computer-based vision system comprising more than two cameras.

The calibration method has been described for the estimation of extrinsic parameters. It also applies to the intrinsic parameters of the computer-based vision system, the 3D point parameters and/or the pose parameters.

Thus, in general, the invention relates to a calibration method in which a 3D mapping of a first sequence is optimized by bundle adjustment, by considering at least one parameter among the extrinsic parameters and/or the intrinsic parameters and/or the 3D landmark parameters and/or the pose parameters to be constant, and said at least one parameters is considered to be variable for the optimization of the 3D mapping of at least one second sequence that is longer than the first sequence and comprising the first sequence.

For the optimization of each 3D mapping, extrinsic parameters and/or intrinsic parameters considered to be constant and non-optimized are kept fixed at an initial approximate value (in the absence of a previous optimization) or at a value estimated in the optimization of another 3D mapping performed previously in the calibration method.

For the optimization of each 3D mapping, 3D landmark parameters and/or pose parameters considered to be constant and non-optimized are kept fixed at the value determined in the calculation of the 3D mapping that is optimized.

The calibration method is particularly advantageous for computer-based vision systems with cameras with non-overlapping fields, but also applies to computer-based vision systems with cameras with overlapping fields and in general to camera systems having cameras with overlapping fields and/or cameras with non-overlapping fields.

The cameras of the computer-based vision system are preferably synchronized so as to ensure that the images captured by the cameras correspond substantially to the same pose of the computer-based vision system, in particular in applications in which the vehicle is moving quickly. In other applications not requiring quick movement of the vehicle, the cameras are not necessarily synchronized, as the vehicle moves only a little bit between the image captures by the different cameras.

Owing to the invention, it is possible to determine a 3D mapping of the environment along a trajectory followed by a vehicle carrying a computer-based vision system. The 3D mapping is precise and determined effectively and quickly, with a reduced calculation time, thereby enabling real-time reconstruction to be envisaged.

The calibration method according to the invention makes it possible to reduce the drift of the scale factor during the 3D mapping reconstruction. This is due in particular to the fact that the parameters considered to be constant for the optimization of a set of 3D mappings are then optimized for a 3D mapping grouping said 3D mappings together.

In addition, the vehicle 2 calibrated according to the calibration method shows an improved capacity for finding the trajectory learned even when it is moved away from this trajectory. The calibration method enables precise guiding of the vehicle 2 thus calibrated.

The vehicle 2 can learn a trajectory without calibration in this case, as the learning method is equivalent to the calibration method except that the extrinsic and/or intrinsic parameters are considered to be constant.

The vehicle 2 can move autonomously along a learned trajectory, identical to or different from the trajectory used for the calibration. To do this, the current image captured by the computer-based vision system is processed by searching for characteristic 2D landmarks, and comparison with landmarks of the 3D mapping of the trajectory learned in order to determine the pose of the vehicle 2. As the vehicle 2 moves along the trajectory, it is possible to approximately estimate its pose when the previous pose is known, for example, information on the movement of the system, such as the movement and steering controls given by the processing module 16. It is therefore possible to determine reference poses of the 3D mapping close to the current pose, and to compare the current image with the 3D landmarks associated with these poses. This makes it possible to quickly determine the position of the vehicle 2, in real time.

In the context of a computer-based vision, the term "real time" means that the processing of each image captured by the computer-based vision system is processed by the processing module 16 before the captured image is refreshed. In the field of computer-based vision systems, the refresh time is generally around 40 ms, which is less than the refresh time of the human retina.

The calibration method according to the invention does not require a priori knowledge of the calibration trajectory. It requires approximate knowledge of the extrinsic parameters and/or intrinsic parameters of the multiple camera system, the calibration method making it possible to determine the extrinsic and/or intrinsic parameters more precisely.

Thus, the calibration method can be implemented remotely or device-independently. In such a case, the vehicle is moved according to a calibration trajectory, and images are captured by the multiple camera system. Then, the images captured are sent and processed by a remote processing module, which returns the values estimated by the extrinsic parameters and/or intrinsic parameters and/or pose parameters of the computer-based vision system and/or 3D landmark parameters.

The calibration method can be used to determine the extrinsic parameters and/or the intrinsic parameters once a modification of these parameters is capable of being produced. For example, such a calibration method is implemented in the event of a replacement of one of the cameras of the computer-based vision system, which is capable of modifying the intrinsic parameters of the camera changed and the extrinsic parameters of the camera set.

The calibration method can be used to calibrate a vehicle guiding system or an autoguided vehicle system, or to calibrate a multiple camera system of a driving assistance system, such as those used on modern automobiles (keeping the vehicle in line, manoeuvring assistance, vehicles travelling in a line, etc.).

The invention claimed is:

1. A method for calibrating a computer-based vision system (10) on-board a vehicle (2), comprising a set of cameras having extrinsic parameters and intrinsic parameters, where the intrinsic parameters are specific to each camera of the set of cameras and the extrinsic parameters are parameters of rigid transformations making it possible to go from coordinate position of one camera to coordinate position of another camera of the set of cameras, the method comprising the reconstruction step of a 3D mapping of landmarks of an environment from digital images of the environment captured by the computer-based vision system (10) during a movement of the vehicle (2) along a trajectory, each digital image corresponding to a pose of the computer-based vision system (10), the 3D mapping comprising 3D landmark parameters and parameters of each pose, the reconstruction step comprising steps of reconstruction of the 3D mapping of image sequences and optimization of said 3D mappings of image sequences by implementing bundle adjustment algorithms, wherein the step of optimization of at least one 3D mapping corresponding to a first image sequence is performed by considering at least one parameter between extrinsic parameters and intrinsic parameters to be constant, and the optimization of at least one 3D mapping corresponding to a second image sequence, which is longer than the first image sequence and comprising the first image sequence, is performed by considering said at least one parameter to be variable so as to estimate this latter.

2. The method according to claim 1, wherein a 3D mapping-which corresponds to a complete sequence of images taken during the movement along the trajectory, is optimized, considering each extrinsic parameter and/or each intrinsic parameter to be variable.

3. The method according to claim 1, wherein-the 3D mappings correspond to partial sequences comprising only a portion of the images taken during the movement along the trajectory are reconstructed by considering at least one parameter between extrinsic parameters and intrinsic parameters to be constant.

4. The method according to claim 3, wherein each 3D mappings which corresponds to a partial sequence, is optimized by considering each extrinsic parameter and/or each intrinsic parameter to be constant.

5. The method according to claim 1, wherein the reconstruction step comprises the following steps:
grouping the images into basic image sequences, each basic sequence overlapping with the next basic sequence;
optimizing each 3D mapping corresponding to a basic sequence by bundle adjustment, and aggregating the 3D mappings corresponding to the basic sequences in order to obtain the 3D mapping of the complete image sequence.

6. The method according to claim 5, in which the aggregation is performed by an ascending hierarchical fusion based on 3D mappings of basic sequences forming the lower level, until the 3D mapping of a complete sequence is obtained, each 3D mapping obtained by fusion of mappings being optimized by bundle adjustment.

7. The method according to claim 6, in which at least one 3D mapping of an intermediate sequence, comprising a basic sequence and being longer than the basic sequence, is optimized by considering at least one parameter between extrinsic parameters and intrinsic parameters to be constant.

8. The method according to claim 1, wherein when a movement translation of the computer-based vision system is detected during the reconstruction of a 3D mapping of a sequence, the extrinsic parameters of the translation are considered to be constant, and at least one extrinsic parameter of a rotation is considered to be variable, during step of optimization of the 3D mapping.

9. The method according to claim 1, wherein, when a movement in a non-rectilinear horizontal plane of the computer-based vision system is detected during the step of reconstruction of a 3D mapping of an image sequence, the extrinsic parameters of a translation, except for a vertical translation, are considered to be variable, and the extrinsic parameters of a rotation are considered to be variable during the step of optimization of the 3D mapping.

10. The method according to claim 1, wherein, when screwing movements with parallel axes, with at least two distinct axes, are detected during the step of reconstruction of a 3D mapping of an image sequence, the extrinsic parameters of a translation, except for a translation in the direction of the screwing, are considered to be variable, and the extrinsic parameters of a rotation are considered to be variable during the step of optimization of the 3D mapping.

11. The method according to claim 1, in which, if a three-dimensional movement is detected during the reconstruction of a 3D mapping of a sequence, the extrinsic parameters of a translation are considered to be variable and the extrinsic rotation parameters of a rotation are considered to be variable during the 3D mapping.

12. The method according to claim 1, wherein, when an image sequence has a length shorter than a predetermined threshold, the image sequence is optimized by considering the extrinsic parameters to be constant and/or the intrinsic parameters to be constant.

13. The method according to claim 1, wherein, when an image sequence has a length shorter than the longest sequence optimized by considering an extrinsic parameter to be variable, then the 3D mapping of said sequence is optimized by considering said extrinsic parameter to be constant.

14. The method according to claim 1, when a trajectory of the vehicle is closed so as to form a loop, 2D landmarks of a current pose matching the 2D landmarks of a previous pose of the camera along the trajectory are added.

15. The method according to claim 14 in which, to detect a closure of a loop, 2D landmark matches between two images taken in two camera poses are determined, by verifying a proximity criterion, and it is considered that a loop has been closed when the number of 2D matches is greater than a threshold.

16. The method according to claim 1, in which the 3D mapping of a complete sequence is optimized by using a Levenberg-Marquardt type algorithm.

17. The method according to claim 1, comprising an image acquisition step.

18. A non-transitory computer readable storage medium on which an executable computer program is encoded, wherein the computer program instructs an information processing module to execute a method for calibrating a computer-based vision system (10) on-board a vehicle (2), comprising a set of cameras having extrinsic parameters and intrinsic parameters, where the intrinsic parameters are specific to each camera of the set of cameras and the extrinsic parameters are parameters of rigid transformations making it possible to go from coordinate position of one camera to coordinate position of another camera of the set of cameras, the method comprising the reconstruction step of a 3D mapping of landmarks of an environment from digital images of the environment captured by the computer-based vision system (10) during a movement of the vehicle (2) along a trajectory, each digital image corresponding to a pose of the computer-based vision system (10), the 3D mapping comprising 3D landmark parameters and parameters of each pose, the reconstruction step comprising steps of reconstruction of the 3D mapping of image sequences and optimization of said 3D mappings of image sequences by implementing bundle adjustment algorithms, wherein the step of optimization of at least one 3D mapping corresponding to a first image sequence is performed by considering at least one parameter between extrinsic parameters and intrinsic parameters to be constant, and the optimization of at least one 3D mapping corresponding to a second image sequence, which is longer than the first image sequence and comprising the first image sequence, is performed by considering said at least one parameter to be variable so as to estimate this latter.

19. A calibration device comprising an information processing module programmed for implementing a method for calibrating a computer-based vision system (10) on-board a vehicle (2), comprising a set of cameras having extrinsic parameters and intrinsic parameters, where the intrinsic parameters are specific to each camera of the set of cameras and the extrinsic parameters are parameters of rigid transformations making it possible to go from coordinate position of one camera to coordinate position of another camera of the set of cameras, the method comprising the reconstruction step of a 3D mapping of landmarks of an environment from digital images of the environment captured by the computer-based vision system (10) during a movement of the vehicle (2) along a trajectory, each digital image corresponding to a pose of the computer-based vision system (10), the 3D mapping comprising 3D landmark parameters and parameters of each pose, the reconstruction step comprising steps of reconstruction of the 3D mapping of image sequences and optimization of said 3D mappings of image sequences by implementing bundle adjustment algorithms, wherein the step of optimization of at least one 3D mapping corresponding to a first image sequence is performed by considering at least one parameter between extrinsic parameters and intrinsic parameters to be constant, and the optimization of at least one 3D mapping corresponding to a second image sequence, which is longer than the first image sequence and comprising the first image sequence, is performed by considering said at least one parameter to be variable so as to estimate this latter.

* * * * *

UNITED STATES PATENT AND TRADEMARK OFFICE
CERTIFICATE OF CORRECTION

PATENT NO. : 9,728,005 B2  
APPLICATION NO. : 14/350983  
DATED : August 8, 2017  
INVENTOR(S) : Michel Dhome et al.

Page 1 of 1

It is certified that error appears in the above-identified patent and that said Letters Patent is hereby corrected as shown below:

On the Title Page

Item (72), Line 11, "Jean-Mare Lavest" should read --Jean-Marc Lavest--

Item (73), Line 3, "Universite Blaise Pascal-Clermong II" should read --Universite Blaise Pascal-Clermont II--

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*